United States Patent [19]

Ross-Myring

[11] 4,088,040
[45] May 9, 1978

[54] 360° CABLE ACTUATING LEVER

[76] Inventor: Brian Ross-Myring, 8822 Zeiler Ave., Pacioma, Calif. 91331

[21] Appl. No.: 758,871

[22] Filed: Jan. 3, 1977

[51] Int. Cl.² .................... F16C 1/10; G05G 11/00
[52] U.S. Cl. ......................... 74/501 R; 74/471 XY; 74/489; 74/491
[58] Field of Search ............ 74/501 R, 501 M, 501 P, 74/551.8, 551.9, 471 XY, 488, 489, 491, 523, 555, 557, 501.5 R, 480 B; 200/6 A, 61.87, 61.88; 251/294, 235, 86; 4/7

[56] References Cited

U.S. PATENT DOCUMENTS

| 2,546,365 | 3/1951 | Leveridge | 74/471 X |
| 2,826,218 | 3/1958 | Barlow et al. | 251/294 X |
| 3,164,160 | 1/1965 | Small | 74/471 X |
| 3,176,536 | 4/1965 | Altenburger | 74/501 R X |
| 3,705,519 | 12/1972 | Sjoo | 74/471 XY |
| 3,898,397 | 8/1975 | Devore et al. | 200/6 A |

FOREIGN PATENT DOCUMENTS

| 23,981 | 1/1919 | Denmark | 74/489 |
| 426,313 | 10/1947 | Italy | 74/471 XY |

Primary Examiner—Samuel Scott
Assistant Examiner—Don E. Ferrell
Attorney, Agent, or Firm—Knobbe, Martens, Olson, Hubbard & Bear

[57] ABSTRACT

A cable actuating lever is disclosed wherein the lever is operable when shifted in any direction within a 360° range. This mechanism is easily attached to the handle bars of bicycles, motorcycles, and similar vehicles where a readily accessible manual control means is required to actuate braking, clutchings or other mechanical operations.

Due to its capability to flex in any direction, the danger of breakage, bending, or becoming inoperable by an impact force applied contrary to its normal operating direction is virtually eliminated.

9 Claims, 7 Drawing Figures

360° CABLE ACTUATING LEVER

BACKGROUND AND SUMMARY OF THE INVENTION

As more people become actively involved in the sport of dirt track bike racing, hill climbing, or simply recreational motor bike riding, the need for safer and more easily operated vehicles becomes apparent. The basic manual operations required of the vehicle operator have not been eliminated, such as in the operation of an automobile; reference herein being made to gear shifting. The need for simplifying these operations has been an ever present objective in the design of the two-wheel vehicles.

Currently, the brake operating mechanism comprises a lever typically mounted on the handle bars of a motorcycle or bicycle in the proximity of the right or left hand grips. It is pivotal in one direction only, toward the hand grip, thus making it operable by the fingers of the hand. All fingers are applied to said lever to perform the mechanical function since any remaining on the hand grip would be pinched by the underside of the lever. If the vehicle is involved in a minor mishap, such as a spill or upset, the projecting lever is usually bent or broken due to its vulnerable mounting on the handle bars. Thus the operator may become stranded in an area which may be remote from repair facilities.

In the preferred embodiment disclosed herein, the cable actuating lever is operable when deflected or shifted in any direction within a 360° range. The bracket supporting said mechanism is easily mounted on the handle bars within the convenient reach of the fingers of the operator's hand. Two or more fingers are applied to the lever in any direction to perform the function of braking or any other mechanical function. In the case of an accident or spill wherein the vehicle is upset, the danger of breakage or bending of the lever is practically eliminated due to its total flexibility in all directions.

These and other advantages of the present invention will become apparent from the following description and claims and are illustrated in the accompanying drawings, in which:

DETAILED DESCRIPTION OF THE PREFERRED EMBODIMENT

Figure 1:
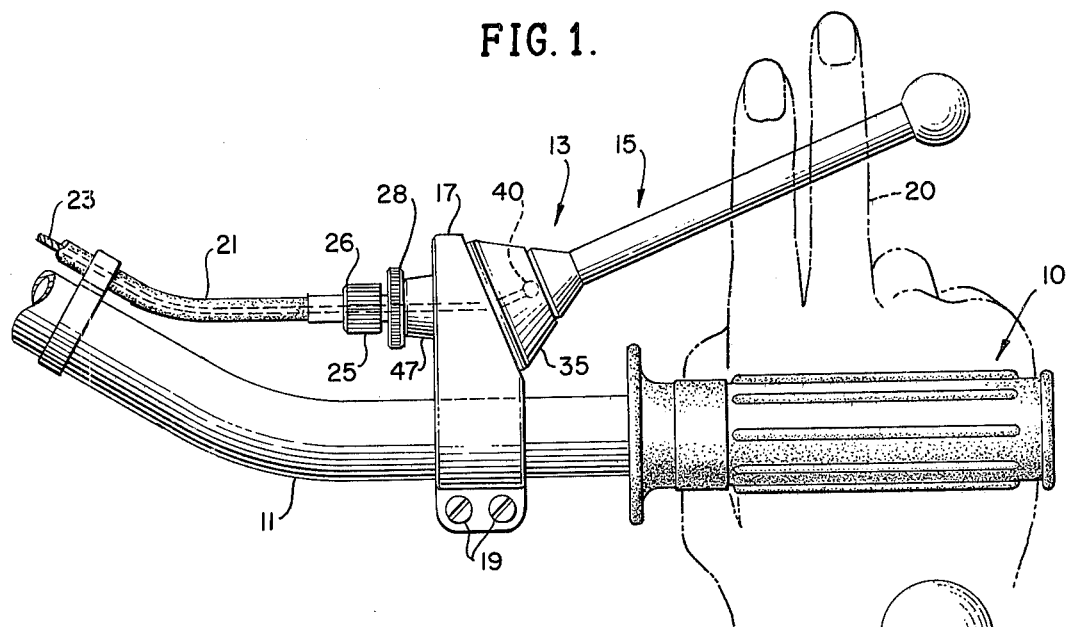
FIG. 1 is a plan view of the right end of a motorcycle handle bar showing the hand grip and the cable actuating lever attached thereon.
Figure 2:
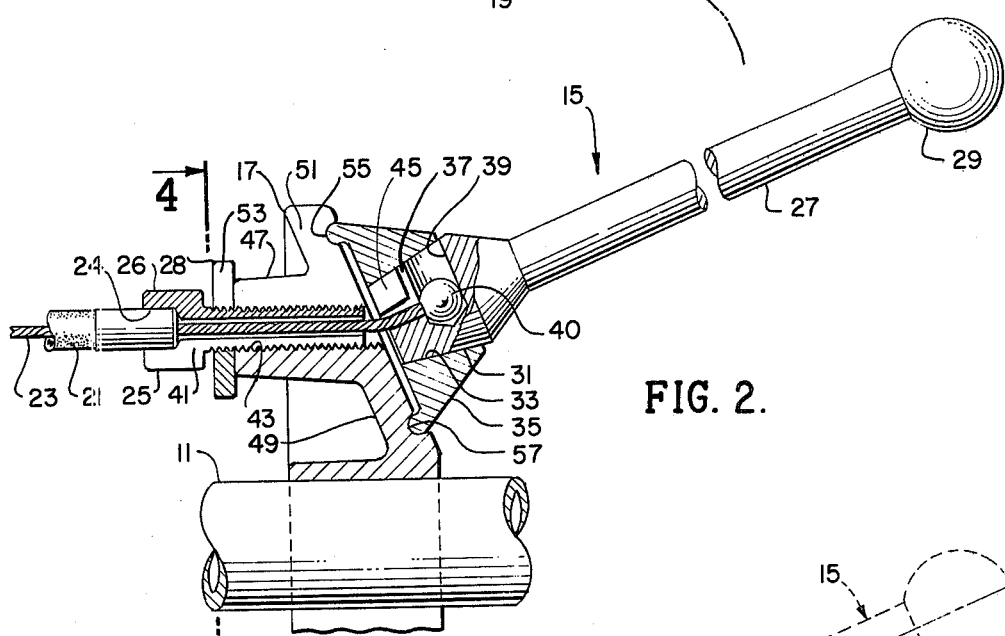
FIG. 2 is a partial sectional view of the cable actuating mechanism in its normal inoperative position.

Referring initially to FIGS. 1 and 2, a hand grip portion 10 of a motorcycle handle bar 11 is shown with the preferred embodiment of the cable actuating mechanism 13 thereon attached. A pivotal lever 15 extending from a mounting bracket 17 securely clamped to the handle bar 11 by means of screws 19 is operated by two or more fingers of the hand 20 while clutching hand grip 10. A flexible armoured conduit 21 encasing a flexible steel cable 23 is inserted in a recessed hole 24 in the serrated head 25 of a tension adjusting screw 26. A jam nut 28 locks the screw 26 in place after the slack adjustment of the conduit 21 and cable 23 is accomplished. The pivotal lever 15 comprises a round shaft portion 27, a spherical ball 29 on its protruding end and a conical end 31. The conical end 31 seats itself precisely into a tapered hole 33 of a conical flange collar 35. To facilitate the attachment of the flexible steel cable 23 to the lever 15, a slot 37 in end 31 is provided to the depth of the axial center of lever 15, terminating into a hole 39 having a diameter large enough to accommodate the check ball 40 clinched on the end of the cable 23. The assembly of the cable 23 to the conical end 31 of the pivotal lever 15 is accomplished in the following manner; the lever 15 is disengaged from its flange collar 35 while the steel cable 23 is inserted in the adjusting screw 26 through a slot 41 extending lengthwise along the longitudinal axis of the screw 26. The end of the cable 23 fitted with the check ball 40 is slipped through a centrally located threaded aperture 43 of the bracket 17, through the tapered aperture 33 of the conical collar 35 and hence into the slot 37 and hole 39 in the conical end 31 of lever 15. The conical end 31 of the lever 15 seats itself into the tapered aperture 33 of the collar 35 thereby securing the check ball 40 and cable 23 to the end of said lever 15. A projecting key 45 molded integrally within the tapered hole 33 of the collar 35 engages the slot 37 of the conical end 31 of lever 15. The key 45 retains the cable 23 in an approximately central axial position when the lever 15 is depressed or pivoted from normal position. The mechanical principle of the lever 15 will be described in detail hereinafter.

Figure 4:
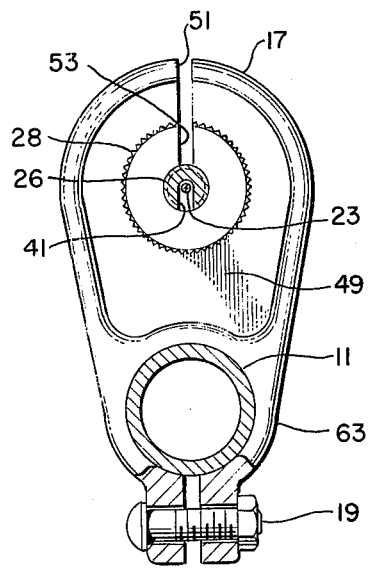
FIG. 4 is a partial sectional view taken along lines 4—4 on FIG. 2.
Figure 5:
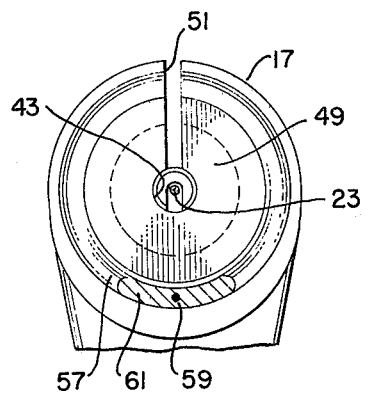
FIG. 5 is an auxiliary view of the face of the bracket taken along lines 5—5 on FIG. 3.

The bracket 17 is molded with a portruding boss 47 extending from the back surface of an inclined wall 49. A slot 51 centrally located on the longitudinal axis of the cable activating mechanism 13 terminates at the threaded aperture 43 of the bracket 17 (see FIG. 4). When the longitudinal slot 41 in the screw 26 is aligned upward with the aforementioned bracket slot 51 and a slot 53 in the jam nut 28 is also aligned upward, a clear passage is provided for the insertion of the cable 23 as it is extended from the conduit 21. This is best shown in FIGS. 4 and 5. The opposite end of the flexible cable 23 may remain connected during this procedure.

The conical flange collar 35 is formed or molded with a circumferential lip 55 at its base. The lip 55 precisely engages an annular groove or recess 57 molded in the inclined wall 49 of the mounting bracket 17. Thus when the cable 23 encased in the flexible conduit 21 has been assembled within the lever 15 and its conical collar 35, the adjusting screw 26 is turned counter clockwise to eliminate any slack between the conduit 21 and the bracket 17 and to adjust for the proper tension in the cable 23 to hold the lever 15 seated in the groove 57. The opposite end (not shown) of the cable 23 is attached directly to the clutch or braking mechanism of the motorcycle or any other vehicle utilizing the above described cable actuating mechanism 13. All of the main component parts of the cable actuating mechanism 13 are molded from high tensile strength plastic or aluminum except for the tension adjusting mechanism comprising the steel screw 26 and steel jam nut 28 which are currently available as stock items.

Figure 3:
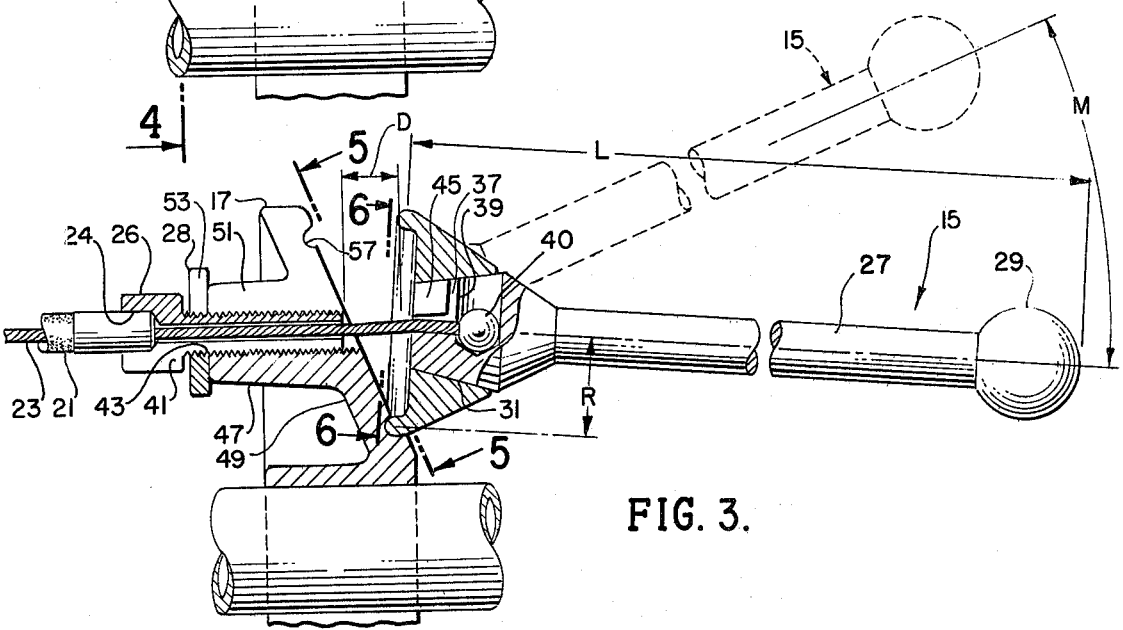
FIG. 3 is a partial sectional view of the cable actuating mechanism showing the lever in a deflected operating position.

FIG. 3 shows the pivotal lever 15 unseated from the circular groove 57 in the inclined wall 49 of the mounting bracket 17. This displacement of the lever 15 from its normal position is accomplished by either a pushing force or gripping action applied by the fingers of the hand 20 as best shown in FIG. 1. The magnitude of the pressure applied to the end of the lever 15 is proportional to the force required to activate the mechanical movement of the clutch or braking mechanism attached to the opposite end of the cable 23 and the diameter of the conical collar 35. Herein the simple principle of the first class lever can be applied to achieve a mechanical advantage of approximately 7 to 1 dependent upon the location of the fingers of the manipulating hand 20 on the lever 15. In an exemplary embodiment, if 5 pounds of finger pressure is applied on the lever 15 at a point 5 inches from the pivot point 59 (see FIG. 5) and the radius R is ¾ of an inch, the mechanical advantage is determined in the following manner:

5# pressure × 5 inches = ¾ inch × resultant force
resultant force = 25 × 4/3 = 100/3 = 33 ⅓ # or approximately 7 times the original finger pressure.

The positioning of the bracket 17 along the handle bar 11 can be adjusted to gain the most favorable position for the operator's finger pressure. A movement M of lever 15 from its normal position (shown as dotted lines in FIG. 3) produces a resultant movement D of cable 23 which is sufficient to activate the braking mechanism or other mechanical movement at the end of the cable 23.

The pivot point or fulcrum 59 of the lever 15 is best shown in FIG. 5. The cross hatched area 61 represents the contact area of the circumferential lip 55 of the conical collar 35 with the circular groove 57. The pivot point 59 would thus appear centrally within the shaded contact area 61. It should be noted here that the pivot point 59 moves to any position within a circular range of 360° in the groove 57 dependent upon the direction of the applied finger pressure to the end of the lever 15. Since the slack in the connecting conduit cable 23 was removed between the bracket 17 and the activating mechanism (not shown), the circumferential lip 55 cannot be dislodged from the groove 57.

FIG. 4 shows a typical method for attaching the bracket 17 to the handle bar 11. A slotted boss 63 encircles the handle bar 11 and is secured thereon by the screws 19. Thus the bracket 17 can be positioned laterally and radially on the handle bar 11 as desired by the vehicle operator for effective finger manipulation of the lever 15. The normal positioning is usually forward, thus permitting the extended fingers of the gripping hand 20 (see FIG. 1) to push the actuating lever 15 in any direction or clench it toward the hand grip 10.

FIG. 5 as previously described shows the engagement area 61 of the lip 55 in the circular groove 57 located in the face of the inclined wall 49 of the bracket 17. The lever 15 becomes operable when tilted in any direction within a 360° range and the contact area 61 wherein the pivot point 59 appears moves to the same angle toward which the force on lever 15 was applied.

Figure 6:
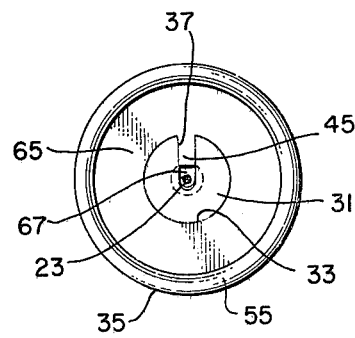
FIG. 6 is an end view of the lever taken along lines 6—6 on FIG. 3.

FIG. 6 shows the bottom 65 of the conical collar 35 wherein the key 45 has engaged the slot 37 of the tapered end 31 of the lever 15. The space 67 for restricting the movement of the steel cable 23 is clearly defined. Thus the projecting key 45 retains said cable 23 in a normally central position.

Figure 7:
FIG. 7 is a partial sectional view of an alternate embodiment of the cable actuating mechanism in its normal inoperative position.

Referring now to FIG. 7, an alternate embodiment of the cable actuating mechanism 13 is shown. Herein a modified pivotal lever 70 comprising a threaded conical collar 71, a threaded jam nut 73, and a flat or oval point set screw 75 securely attaches said lever 70 to the end of the flexible steel cable 23. The mounting bracket 79 has a centrally positioned aperture 81 in the protruding boss 82 wherein the reinforcement ferrule 83 on the conduit 21 fits snugly against a shoulder 85. The flexible steel cable 23 is drawn through a smaller aperture 87 which pierces the inclined wall 89 of the mounting bracket 79 and emerges in the exact center of the circular groove 91 molded in the face 93 of the inclined wall 89. A circumferential lip 95 molded around the base of conical collar 71 similar to the lip 55 on the collar 35 shown in the first embodiment seats itself in the circular groove 91 thereby positioning lever 70 centrally on the inclined wall 89. The free end of the cable 23 emerging from the aperture 87 is passed through a longitudinal aperture 88 in the threaded end of lever 70 and is secured by the set screw 75 which is screwed into a threaded aperture 97 drilled traversely through the diameter of lever 70. The set screw 75 deforms the cable 23 at 99 thereby preventing its withdrawal from the aperture 88 when the lever 70 is deflected in any direction to actuate the braking mechanism or other mechanical linkage to which the end of said cable 23 is attached. A slot 101 is located on the axis of bracket 79 and terminates at the apertures 81 and 87. This slot facilitates the easy assembly of the cable actuating mechanism in the following manner; the end of the cable 23 is inserted in the disengaged lever 70 and therein secured by means of the set screw 75. The threaded conical collar 71 with its jam nut 73 is backed off the end of the lever 70. The cable with its retracted conduit 21 is then passed through the slot 101 to be centrally positioned in the bracket 79 wherein the ferrule 83 seats itself in the aperture 81. The conical collar 71 is then adjusted to remove all slack in the cable 23 and the jam nut 73 is locked in place.

I claim:

1. A device for actuating control cables on a handle bar equipped vehicle comprising:
    a bracket to be attached to the handle bar of a vehicle;
    means for mounting a control cable actuating lever to said bracket including means for allowing said lever to rock in any angular direction on an annular pivot in response to manually applied control forces and also for allowing rocking motion in any angular direction by said lever without damage to said lever in response to randomly directed accident forces; and
    means for attaching a vehicle control cable to said lever to actuate said cable upon rocking said lever from its static rest position in any angular direction on said annular pivot.

2. A device according to claim 1 in which said means for mounting and allowing said rocking motion on an annular pivot comprises:
    an annular base attached to said lever to provide an annular pivotal fulcrum, said annular base and attached lever held to said bracket when in a static rest position by a tensioned flexible control cable passing between said bracket and said lever and annular base assembly.

3. The device of claim 2 including means for adjusting the tension of said flexible control cable to vary the force necessary to rock said lever on said annular pivot about its static rest position.

4. The device of claim 2 in which said control cable is actuated by motion through a point substantially at the geometric center of the annular pivotal fulcrum so that equal rocking displacements in any direction of said lever and integrally attached annular base displaces the control cable equal distances from its static rest position.

5. An improved control cable actuating mechanism for a vehicle with handle bars comprising:
a lever means with an attachable annular pivotal base;
a bracket to be attached to the handle bar of said vehicle, said bracket including a base area for mounting said annular pivotal base and also including a passage through said bracket terminating at said base area, said passage adapted to allow insertion of a vehicle control cable to said base area;
means for attaching said control cable from said passage in said bracket base area to said lever means; and means for tensioning said control cable to hold said annular base to said bracket base area, said tension sufficient to hold said base to said bracket when at rest while simultaneously allowing said lever to rock in all angular directions on said annular pivotal base in response to both manually applied control forces and randomly directed accidental forces.

6. A mechanism for actuating control cables on a handle bar equipped vehicle comprising:
a bracket including means for selectively attaching said bracket to a handle bar so that said bracket is attachable to said handle bar at variable positions along said handle bar, said bracket including an inclined wall having a protruding boss with a threaded bore formed through said boss and wall and also having an annular groove formed on the surface of said wall with the geometric center of said annular groove located substantially at the center of said threaded bore where said bore pierces said inclined wall, said bracket having a screw threaded into said threaded bore, said screw having a passage formed therein to allow passage of a vehicle control cable therethrough, said screw also including a recessed head adapted for insertion of a ferrule for an armored conduit so that threading such screw moves said ferrule and armored conduit to adjust the tension in said control cable;
a conical lever base, said base forming a conical flange collar having an annular circumferential lip adapted to fit inside said annular groove on said bracket wall, said conical collar defining a tapered aperture around its central axis, said conical collar including an integrally attached key extending toward the axial center of said aperture;
a lever having a tapered end to mate into the tapered aperture of said conical collar, said lever including a slot formed in said tapered end extending substantially to the axial center of said lever, said slot constructed to fit over said key in said conical collar so that when said tapered lever end is mated into said conical collar base there is formed a chamber at the end of said slot wherein a check ball attached to a control cable is restrained by said key in said chamber, said key and slot also forming a passage for holding a control cable substantially along the central axis of said conical base, said lever further extending outward from said tapered end to allow for application of manual actuating forces; and
said lever and conical base held together by inserting said tapered lever into the tapered aperture of said conical base, said base and lever assembly held to said bracket by placing said circumferential lip into said annular groove on said bracket and applying tension to said control cable to transmit a clamping force to said check ball to clamp said lever and base assembly together and to said bracket when actuating forces are not applied to said lever, said clamping simultaneously allowing said lever and base assembly to rock in any angular direction on an annular pivot formed by said circumferential lip and said bracket groove, in response to manual actuating forces producing actuating motion in said cable and in response to randomly directed accident forces.

7. The mechanism of claim 6 in which said means for tensioning said cable includes means for applying a selectively variable tension to said cable.

8. A mechanism for actuating control cables on a handle bar equipped vehicle comprising:
a bracket including means for selectively attaching said bracket to a handle bar so that said bracket is attachable to said handle bar at variable positions along said handle bar, said bracket including an inclined wall having a protruding boss with a recess formed therein for positioning an armored conduit ferrule within said recess, said wall having a passage extending from said recess through said wall to allow passage of a control cable through said wall, said wall having an annular groove formed in said wall with the geometric center of said groove at the center of the passage where said passage pierces said wall;
a conical lever base, said base including an annular lip adapted to fit inside said annular wall groove, said base also including a threaded bore for receiving a threaded lever handle extending through said base along the central axis of said base;
a lever, said lever including a threaded end constructed to be threaded into the bore of said conical base, said lever including a longitudinal aperture through said threaded end allowing insertion of a vehicle control cable therethrough, said lever including also a threaded transverse aperture intersecting said longitudinal aperture for threading a set screw to hold an inserted control cable within said longitudinal aperture upon advancing said set screw into said transverse aperture to contact said cable; and
said lever and base held together by threading said lever to said base, said lever and base assembly mounted to said bracket when in a static rest position by placing said annular lip into said annular groove in said bracket wall, said lever and base assembly held to said bracket by tension in said control cable, said cable held within said lever by said set screw and passing through said bracket to clamp said assembly to said bracket, said clamping force simultaneously allowing said lever and base to rock in any angular direction on annular pivot formed by said lip and groove in response to manual actuating forces to actuate said control cable and in response to randomly directed accident forces.

9. The mechanism of claim 8 in which said means for attaching said control cable includes means for actuating said control cable at substantially the geometric center of said annular pivot so that equal angular displacements in any direction of said annular pivot from said bracket displaces the control cable equal distances from the static rest position.

* * * * *

UNITED STATES PATENT AND TRADEMARK OFFICE
CERTIFICATE OF CORRECTION

PATENT NO. : 4,088,040
DATED : May 9, 1978
INVENTOR(S) : Brian Ross-Myring

It is certified that error appears in the above-identified patent and that said Letters Patent are hereby corrected as shown below:

```
Col. 6, line 13, delete "7." and insert --6.--
Col. 6, line 13, delete "6" and insert --5--

Col. 6, line 16, delete "8." and insert --9.--

Col. 6, line 61, delete "9." and insert --7.--
Col. 6, line 61, delete "8" and insert --5--

Col. 5, line 24, delete "6." and insert --8.--
```

Signed and Sealed this

Twenty-ninth Day of July 1980

[SEAL]

Attest:

SIDNEY A. DIAMOND

Attesting Officer    Commissioner of Patents and Trademarks